(12) United States Patent  
Budinski et al.

(10) Patent No.: US 8,053,134 B2
(45) Date of Patent: Nov. 8, 2011

(54) FUEL CELL COMPRESSION RETENTION SYSTEM USING PLANAR STRIPS

(75) Inventors: Michael K. Budinski, Pittsford, NY (US); Eric J. Connor, Rochester, NY (US); Daniel Miller, Victor, NY (US); Yeh-Hung Lai, Webster, NY (US); Gerald W. Fly, Geneseo, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 972 days.

(21) Appl. No.: 11/638,283

(22) Filed: Dec. 13, 2006

(65) Prior Publication Data

US 2008/0145713 A1 Jun. 19, 2008

(51) Int. Cl.
*H01M 2/20* (2006.01)
*H01M 8/24* (2006.01)

(52) U.S. Cl. .......... 429/470; 429/452; 429/467

(58) Field of Classification Search .......... None
See application file for complete search history.

(56) References Cited

U.S. PATENT DOCUMENTS

| 2,485,443 | A | * | 10/1949 | Hathaway | 267/110 |
| 2,517,269 | A | * | 8/1950 | Wolfe | 267/182 |
| 3,961,835 | A | | 6/1976 | Huang et al. | |
| 4,430,390 | A | * | 2/1984 | Fekete | 429/34 |
| 4,901,188 | A | | 2/1990 | Gilberts | |
| 4,919,403 | A | * | 4/1990 | Bartholomew | 267/165 |
| 5,484,666 | A | | 1/1996 | Gibb et al. | |
| 5,789,091 | A | | 8/1998 | Wozniczka et al. | |
| 6,079,679 | A | | 6/2000 | Mitchell | |
| 6,124,051 | A | | 9/2000 | Johnson | |
| 6,235,391 | B1 | | 5/2001 | Contreras et al. | |
| 6,663,996 | B2 | * | 12/2003 | Gibb et al. | 429/37 |
| 2006/0040166 | A1 | * | 2/2006 | Budinski et al. | 429/37 |

* cited by examiner

*Primary Examiner* — Barbara Gilliam
*Assistant Examiner* — Adam A Arciero
(74) *Attorney, Agent, or Firm* — Fraser Clemens Martin & Miller LLC; J. Douglas Miller

(57) ABSTRACT

A fuel cell system is provided including a fuel cell stack having a first end and second end, the stack comprising at least one fuel cell, a first end unit disposed adjacent the first end of the fuel cell stack, a second end unit disposed adjacent the second end of the fuel cell stack, and a compression retention system. The compression retention system includes at least one generally planar strip forming at least one bend, wherein the at least one strip extends from the first end unit to the second end unit of the fuel cell system. The at least one bend of the planar strip can form at least one serpentine shape.

15 Claims, 4 Drawing Sheets

FUEL CELL COMPRESSION RETENTION SYSTEM USING PLANAR STRIPS

FIELD OF THE INVENTION

The present disclosure relates to fuel cell systems and, more particularly, to compression retention systems for fuel cell stacks.

BACKGROUND OF THE INVENTION

Fuel cells have been proposed as a clean, efficient and environmentally responsible power source for electric vehicles and various other applications. One example of a fuel cell is the Proton Exchange Membrane (PEM) fuel cell. The PEM fuel cell includes a membrane-electrode-assembly (MEA) that generally comprises a thin, solid polymer membrane-electrolyte having a catalyst and an electrode on both faces of the membrane-electrolyte.

The MEA generally comprises porous conductive materials, also known as gas diffusion media, which form the anode and cathode electrode layers. Fuel, such as hydrogen gas, is introduced at the anode where it reacts electrochemically in the presence of the catalyst to produce electrons and hydrogen cations. The electrons are conducted from the anode to the cathode through an electrical circuit connected therebetween. Simultaneously, the hydrogen cations pass through the electrolyte to the cathode where an oxidant, such as oxygen or air, reacts electrochemically in the presence of the electrolyte and catalyst to produce oxygen anions. The oxygen anions react with the hydrogen cations to form water as a reaction product.

The MEA is generally interposed between a pair of electrically conductive contact elements or separator plates to complete a single PEM fuel cell. Separator plates serve as current collectors for the anode and cathode, and have appropriate channels and openings formed therein for distributing the fuel cell's gaseous reactants (i.e., the $H_2$ & $O_2$/air) over the surfaces of the respective electrodes.

In practice, however, PEM fuel cells are not individually operated. Rather, PEM fuel cells are connected in series, or stacked one on top of the other, to form what is usually referred to as a fuel cell stack. PEM fuel cell stacks are generally loaded in compression in order to maintain low interfacial electrical contact resistance between the separator plates, the gas diffusion media, and the catalyst electrode. The low interfacial contact resistance in a PEM fuel cell stack is directly related to the compression loading. A typical compression load on the separator plate may range from about 50 to about 400 psi and is controlled by a compression retention system.

Compression retention systems are typically designed in a manner effective to offset strains produced by membrane swelling that can occur with changes in humidity and temperature and compressive stress relaxation in the fuel cell stack. Such systems act to minimize an over-compression and damage of gas diffusion media in the fuel cell stack, as well as maintain the desired stack compression and contact pressure between separator plates, gas diffusion media, and catalyst layers. Maintenance of stack compression sustains electrical contact and facilitates lower contact resistance between individual fuel cells within the stack.

PEM fuel cell stacks also generally include side plates for holding individual fuel cells laterally in place and generally for enclosing the fuel cell stack. Such systems are typically rigid and fixed in place, often requiring complex seals, plumbing and electrical connections to account for the swelling and contraction (also known as breathing) of the fuel cell stack that occurs with humidity and temperature cycling during operation.

It is stated in U.S. Pat. No. 5,484,666 to Gibb et al. that conventional compression systems have consisted of tie rods extending through and between endplate assemblies and secured with fastening nuts. Springs threaded on the tie rods and interposed between the fastening nuts and the endplates have been used to apply resilient compressive force to fuel cell stacks in the stacking direction.

Fuel cell side plates having controlled tensile compliance are also reported in U.S. Pat. Appl. Pub. No. 2006/0040166 to Budinski et al. It is stated in Budinski et al that the compression forces on a fuel cell stack can be controlled by incorporating at least one spring element into a side plate.

In U.S. Pat. No. 5,789,091, Wozniczka et al. further reports a mechanism for securing a fuel cell stack in an assembled and compressed state which includes at least one compression band that circumscribes end plate assemblies and interposed fuel cells in the fuel cell stack.

There is a continuing need for a compression retention system for electrochemical fuel cells that is compliant, provides substantially uniform compression during fuel cell stack operation and with a variety of stack sizes, facilitates relative movement between the retention system and fuel cell stack, and optimizes volumetric and thermal efficiency.

SUMMARY OF THE INVENTION

In concordance with the instant disclosure, a compression retention system that is compliant, provides substantially uniform compression during fuel cell stack operation and with a variety of stack sizes, facilitates relative movement between the retention system and fuel cell stack, and optimizes volumetric and thermal efficiency is surprisingly discovered.

In one embodiment, a fuel cell system comprises a fuel cell stack having a first end and second end, the stack comprising at least one fuel cell, a first end unit disposed adjacent the first end of the fuel cell stack, a second end unit disposed adjacent the second end of the fuel cell stack, and a compression retention system. The compression retention system includes at least one generally planar strip forming at least one bend, the at least one strip disposed adjacent the fuel cell stack and extending from the first end unit to the second end unit.

A strip including a generally planar material and forming at least one bend is further described. The bend formed by the strips includes at least one serpentine shape. In particular embodiments, the at least one serpentine shape also has at least one opening formed therein, which in certain instances also has a serpentine shape.

In one particular embodiment, a compression retention system is provided including a planar strip formed from metal and having a repeating serpentine shape. The planar strip includes a serpentine-shaped opening formed therein and has a first zone and a second zone, the first zone including a region of the strip adjacent a bend of the serpentine shape, and the second zone including a region at a bend of the serpentine shape. The average width of the first zone is less than half an average width of the second zone.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
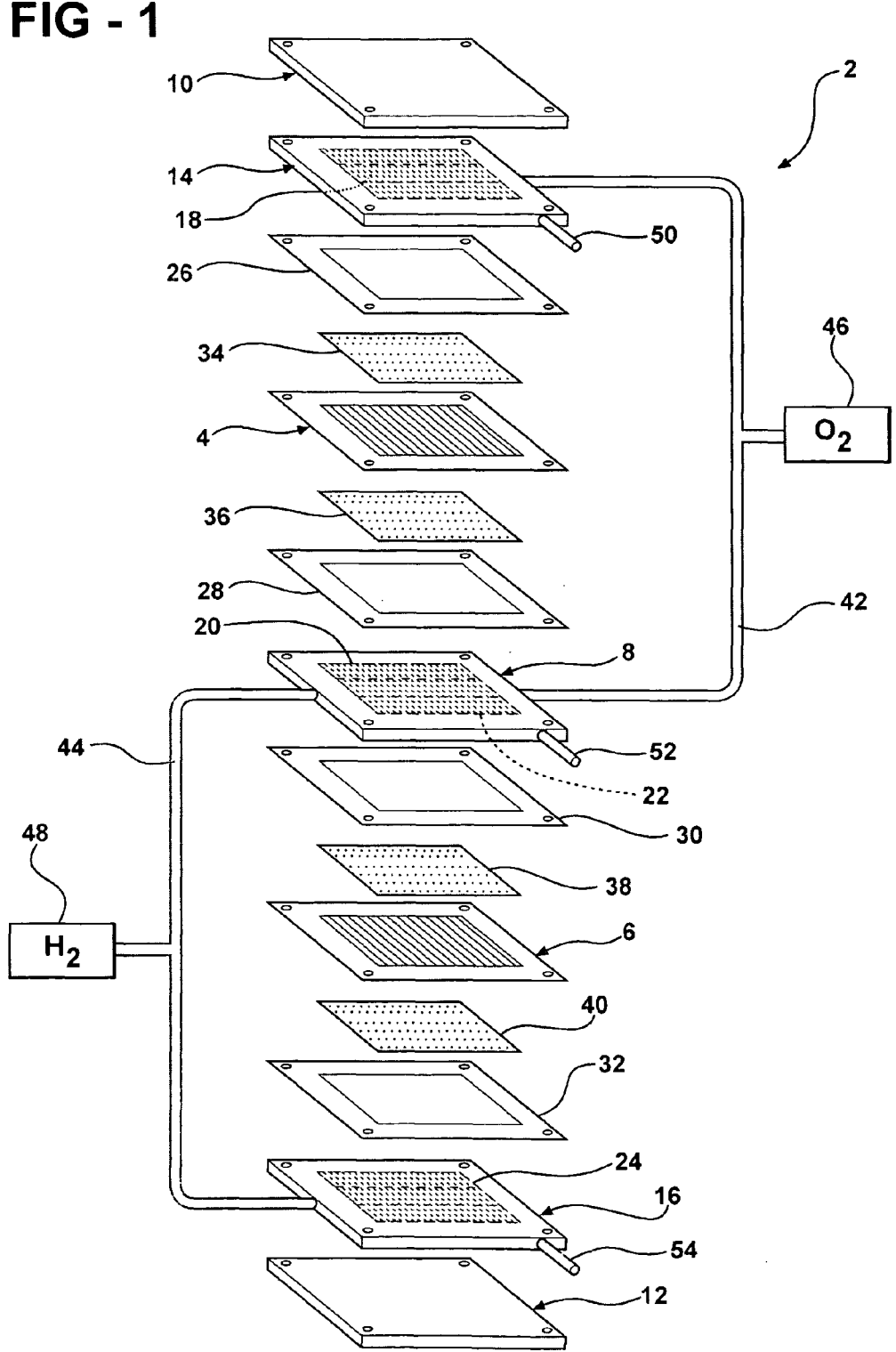
FIG. 1 illustrates a schematic, exploded perspective view of a PEM fuel cell stack (showing only two cells)

The following description is merely exemplary in nature and is not intended to limit the present disclosure, application, or uses. It should also be understood that throughout the drawings, corresponding reference numerals indicate like or corresponding parts and features.

FIG. 1 depicts a two cell PEM fuel cell stack 2 having a pair of membrane-electrode-assemblies (MEAs) 4, 6 separated from each other by an electrically conductive fluid distribution element 8, hereinafter bipolar or separator plate 8. The MEAs 4, 6 and separator plate 8, are stacked together between end plates 10 and 12, and end contact elements 14 and 16. The end contact elements 14 and 16, as well as both working faces of the bipolar plate 8, contain a plurality of flowpath grooves or channels 18, 20, 22, and 24, respectively, for distributing fuel and oxidant gases (e.g., $H_2$ and $O_2$) to the MEAs 4 and 6. Nonconductive gaskets 26, 28, 30, and 32 provide seals and electrical insulation between the several components of the fuel cell stack.

The MEAs 4, 6 can include gas permeable conductive materials as electrodes 34, 36, 38, 40, for example carbon/graphite diffusion paper. The electrodes 34, 36, 38, 40 press up against MEAs 4, 6. The end contact units 14, 16 press up against the carbon/graphite papers 34, 40 respectively, while the separator plate 8 presses up against the carbon/graphite paper 36 on the anode face of MEA 4, configured to accept hydrogen-bearing reactant, and against carbon/graphite paper 38 on the cathode face of MEA 6, configured to accept oxygen-bearing reactant. Oxygen is supplied to the cathode side of the fuel cell stack 2 from storage tank 46 via appropriate supply conduit 42, while hydrogen is supplied to the anode side of the fuel cell from storage tank 48, via appropriate supply conduits 44. Alternatively, ambient air may be supplied to the cathode side as an oxygen source and hydrogen to the anode from a methanol or gasoline reformer, and the like. Exhaust conduits (not shown in FIG. 1) for both the anode and cathode sides of the MEAs 4, 6 are also provided. Additional conduits 50, 52, and 54 are provided for supplying liquid coolant to the separator plate 8 and end plates 14 and 16. Appropriate conduits for exhausting coolant from the separator plate 8 and end plates 14 and 16 are also provided (not shown).

It should be appreciated that even though particular embodiments disclosed herein describe fuel cell systems having PEM fuel cells, the invention of the disclosure may be applied to fuel cell systems utilizing other types of fuel cells such as, for example, metal hydride fuel cells, phosphoric acid fuel cells, solid oxide fuel cells, electrogalvanic fuel cells, and alkaline fuel cells.

Figure 2:
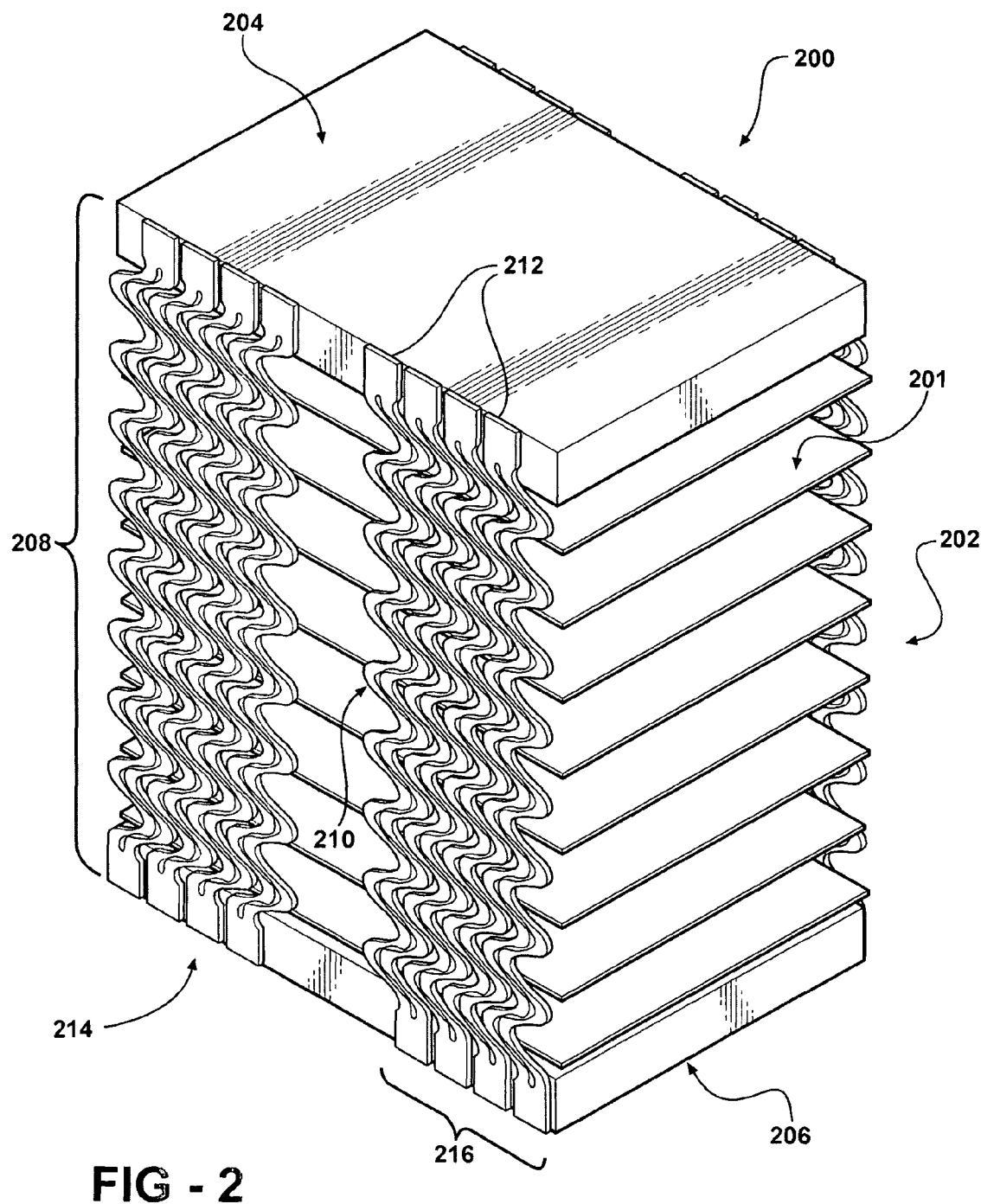
FIG. 2 is a perspective view of a fuel cell system having a compression retention system according to an embodiment of the invention.

Referring next to FIG. 2, one embodiment of a fuel cell system 200 according to the present invention is shown. The fuel cell system 200 has a fuel cell stack 202 disposed between a first end unit 204 and a second end unit 206. The fuel cell system 200 includes a compression retention system 208 including at least one strip 210. The one or more strips 210 are generally planar and have at least one bend 301.

The planar strip 210 can be disposed adjacent to the fuel cell stack 202 of the invention and generally extends from the first end unit 204 to the second end unit 206. It should be understood that the at least one planar strip can extend from first and/or second end units 204, 206 to other locations on the fuel cell system 202.

The at least one planar strip 210 is connected to the first end unit 204 and the second end unit 206 by fastening means 212 at opposite ends of the planar strip 210. Various fastening means 212 can be used as desired. Nonlimiting examples of suitable fastening means 212 can include brackets, clamps, clips, adhesive, fastening bolts and nuts, welds, screws, combinations thereof, and the like.

The planar strip 210 of the present invention is generally disposed adjacent the fuel cell stack 202. In particular embodiments, one or more of the planar strips 210 form a partial or complete side plate 214 adjacent the fuel cell stack 202. The planar strips 210 forming such a side plate 214 inhibit or militate against the migration of MEAs 4, 6 in individual fuel cells 201 of fuel cell stack 202 as the fuel cell stack 202 grows and shrinks during operation. One of ordinary skill in the art should further understand that the planar strips 210, being adjacent to the fuel cell stack 202, can advantageously form an interface that moves with the expansion and contraction of the fuel cell stack 202. That is, the planar strips 210 can form a sliding interface with the fuel cell stack 202.

In one particular embodiment, the at least one planar strip 210 disposed adjacent the fuel cell stack 202 of the disclosure is under tension. Being under tension, it should be understood that the planar strip 210 applies a compressive force to the fuel cell stack 202. The compressive force urges the individual fuel cells 201 toward one another and facilitates electrical contact therebetween. It should be further understood that the application of compressive force to the stack 202 generally reduces electrical contact resistance between individual fuel cells 201 and improves the overall electrical efficiency of the fuel cell stack 202.

The planar strips 210 can be placed in tension by first attaching the planar strips 210 to the first end unit 204. The planar strips 210 are then temporarily attached at an opposite end of the strips 210 to an immovable fixture, for example a floor fixture, and a compressive load is placed on the fuel cell stack 202. The compressive load applied to the fuel cell stack 202 simultaneously compresses the fuel cell stack 202 and places the planar strips 210 in tension. The planar strips 210 are then affixed to the second end unit 206 before being detached from the immovable fixture, thus providing a compressive force on the fuel cell stack 202.

Alternatively, the planar strips 210 can be placed in tension by temporarily compressing the fuel cell stack 202 or loading the stack 202 to a compression higher than desired for the assembled unit, attaching the at least one planar strip 210 to the fuel cell stack 202 at both the first end unit 204 and the second end unit 206 with the fastening means 212, and then removing the load and allowing the compressed stack 202 to decompress slightly, thereby placing the planar strips 210 in tension. The compression retention system 208 comprising the planar strips 210 in tension thereby maintains a compressive force on the fuel cell stack 202.

In an illustrative embodiment, the compression retention system 208 comprises more than one planar strip 210. In a particularly illustrative example, at least a portion 216 of planar strips 210 is nested together. In the embodiment shown in FIG. 2, the fuel cell stack 202 has the compression retention system 208 including sixteen (16) individual planar strips 210 within nested portions 216 of four (4) each.

As defined herein, planar strips 210 are nested when they are placed substantially alongside each other and adjacent to the fuel cell stack 202. In the embodiments shown, the planar strips 210 in the nested portion 216 do not overlap. However, it is understood that the nested portions 216 may overlap, if desired. Advantageously, the nesting of individual planar strips 210 allows for the tailored selection of a variety of spring rates, meaning that one of skill in the art is able to easily match spring rates of conventional compression retention systems. Nesting of planar strips 210 can also result in a similar or lower spring rate with use of a lower volume and/or mass of compression retention material, particularly in comparison to conventional side plates or spring sheets.

Figure 3:
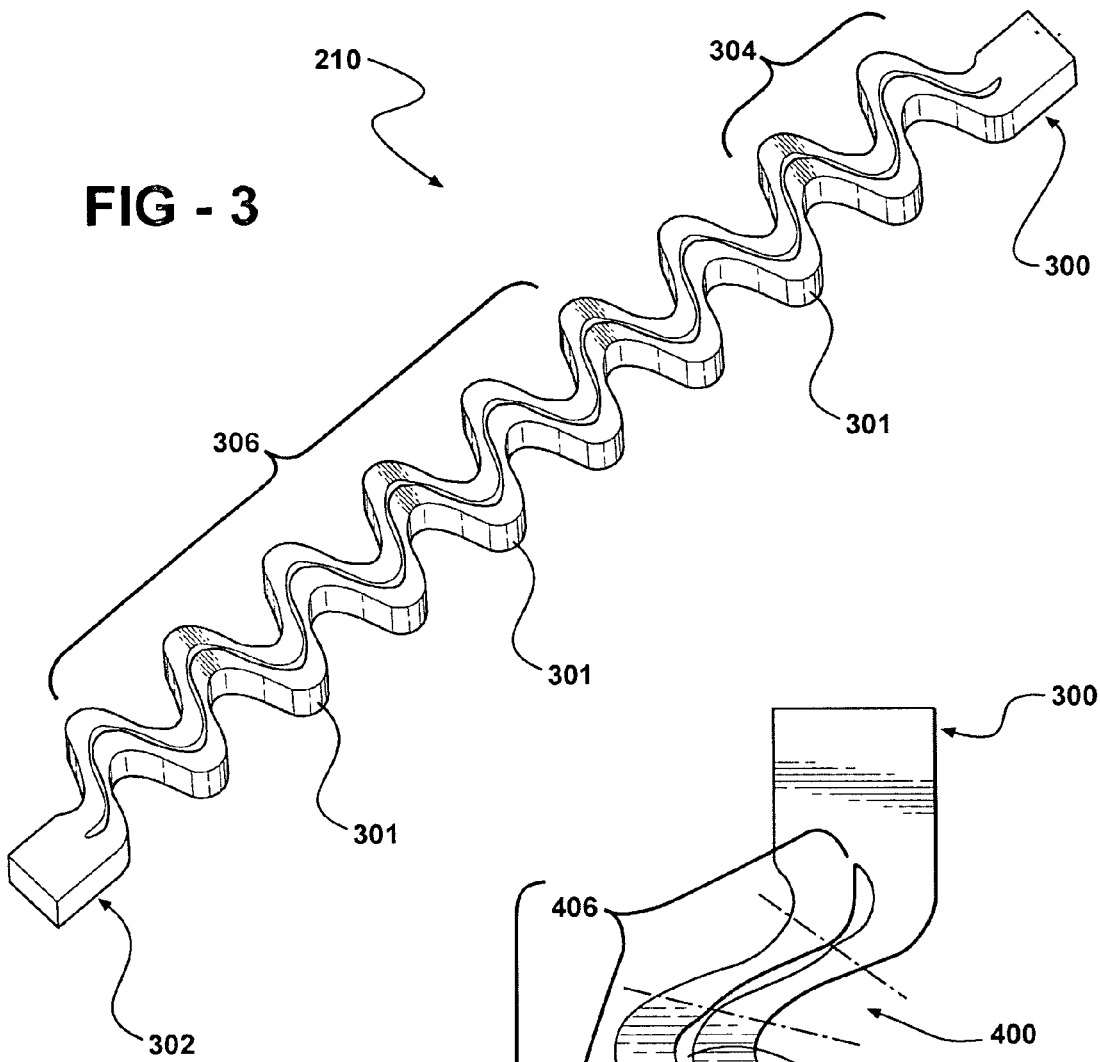
FIG. 3 is a perspective view of an individual planar strip according to an embodiment of the invention.
Figure 4:
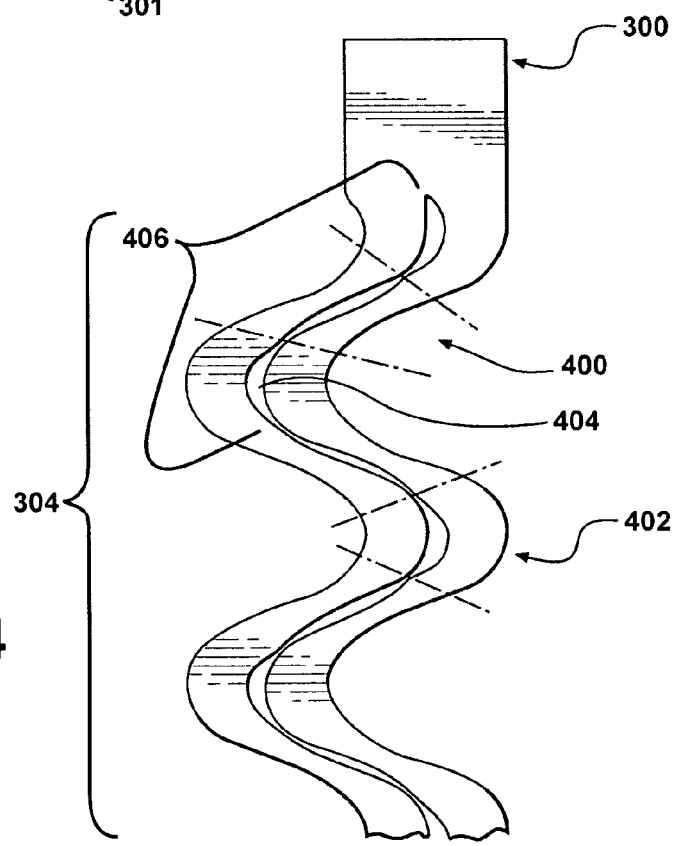
FIG. 4 shows a fragmentary front view of the planar strip illustrated in FIG. 3.

In reference to FIGS. 3 and 4, at least a portion of an individual planar strip 210 according to the present disclosure is shown. The individual strips 210 can be compliant. As used herein, the term compliant means that, when the planar strip 210 is applied as part of a compression retention system 208, the planar strip 210 maintains a uniform compressive force on the fuel cell stack 202 as the stack 202 expands and contracts during operation. Being compliant, or having a low stiffness, the individual strips 210 have a low spring rate under a compressive load of many tons. As a nonlimiting example, in a compression retention system 208 applying a mean compressive load of about 3 tons to about 8 tons, it has now been found that the compressive force applied by the system 208 will not vary by more than about a quarter (±0.25) ton during typical operational breathing of the fuel cell stack 202. Favorable results have been obtained where a compressive load of about 5.5 tons is used. At about 5.5 tons, variations in compression of about 0.15 tons have been found.

Being planar, the planar strips 210 typically have a surface that is substantially flat. In general, the planar strips 210 have a greater length in a first dimension, a lesser length in a second dimension and, in comparison, are relatively thin in a third dimension. In the embodiment shown, the planar strip 210 according to the present invention has a substantially flat surface and has an average thickness from about 1 mm to about 10 mm, an average length of about 200 mm to about 1100 mm and an average width from about 10 mm to about 60 mm, although strips 210 having different dimensions can be used as desired. In an embodiment, the average thickness of the planar strip 210 is about 4 mm, the average length is about 463 mm, and the average width is about 24 mm. It should be understood that the size and type of fuel cell stack 202, as well as the compressive load desired, dictate the overall dimensions of the planar strips 210 of the present invention, and that other dimensions may also be used. It should be further appreciated that the planar strips 210, generally having a substantially greater length than width, are therefore different than planar spring sheets.

The planar strip 210 of the invention includes upper and lower portions 300, 302 for securing to upper and second end units 204, 206. Formed between the upper and lower portions 300, 302 are one or more bends 301. As defined herein, suitable bends 301 include discrete or repeating angles, for example acute, right and obtuse angles, arcs, arches, bows, corners, curves, turns, twists, and various combinations thereof. Other bends 301 can also be formed by the planar strip 210. It should be further understood that the bends 301 formed by the planar strip 210 can vary in width along the length of discrete bends and/or between individual bends 301.

In one embodiment of the present disclosure, the bends 301 include at least one serpentine shape or S-shape 304. Illustratively, the bends 301 can comprise a repeating serpentine shape 306 formed between upper and lower end portions 300, 302.

The serpentine shape 304 formed by a planar strip 210 can be characterized by one or more zones. The individual zones may vary in width between individual zones and/or throughout individual zones. As a nonlimiting example, the serpentine shape can have at least two zones, for example a first zone 400 and a second zone 402. The first zone 400 comprises a region of the serpentine shape existing both before and after a bend 301. The second zone 402 includes a region existing at about the location of a bend 301. In particular embodiments, the average width of the first zone 400 is less than the average width of the second zone 402. As a nonlimiting example, the average width of the first zone 400 may be less than about half (about 0.5 times) the average width of the second zone 402. In a further nonlimiting example, the average width of the first zone 400 is less than about one quarter (about 0.25 times) the average width of the second zone.

The planar strip 210 can be formed from a variety of elastic or resilient materials that are compliant as described herein. As nonlimiting examples, the compliant strip of the present invention can comprise metal, metal alloys, polymers (e.g. elastomers and plastics), elastic textiles and combinations thereof. In particular embodiments, the planar strip 210 is formed from a metal such as aluminum, brass, copper, steel, tin, nickel, titanium, or alloys thereof. It should be understood that materials that retain elasticity over the lifetime of a fuel cell system and upon repeated exposure to conventional fuel cell operating temperatures are suitable materials for the purposes of this invention.

Illustratively, the planar strip 210 can have one or more openings 404 formed therein. The presence of the opening 404 formed in the strip 210 generally increases the compliancy of the strip 210 and permits a larger deflection under a load than would be possible in the absence of the opening 404. The shape of the at least one opening 404 in the strip 210 is selected to substantially uniformly store stress in strip 210 under the tensile strain or load.

The at least one opening 404 can be formed in the planar strip 210 to correspond substantially to the shape of the strip 210. In one particular embodiment, the at least one opening 404 conforms to a serpentine shape or S-shape 406 formed by the planar strip 210. The breadth of the opening 404 along the length of the strip 210 can be constant or variable. In a particular example illustrated in FIG. 4, the opening 404 is wide at the first zone 400, narrow in the transition from the first zone 400 to the second zone 402, and wide again at the second zone 402. In another nonlimiting example, there can be two openings 404 formed parallel to each other in the planar strip 210. More openings 404 can be used as desired. It should be understood that the size, shape, and number of openings is selected to uniformly store stress throughout the strip 210.

Figure 5:
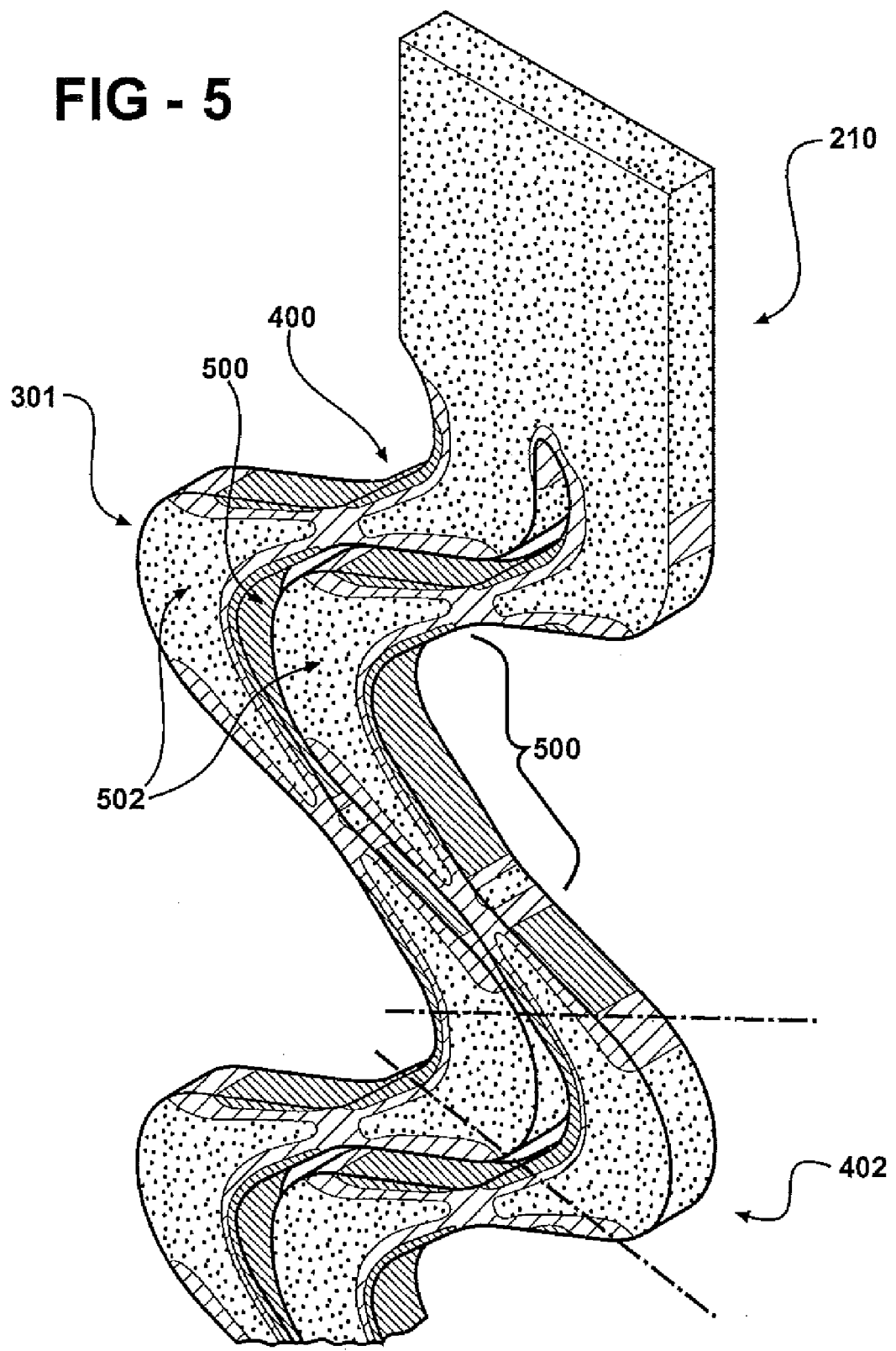
FIG. 5 is a stress contour diagram of a finite element analysis model showing the distribution of stress on the planar strip illustrated in FIGS. 3 and 4.

As shown in FIG. 5, it is now surprisingly found that a planar strip 210 having a repeating serpentine shape 306 according to the present invention exhibits a substantially uniform distribution of load. That is, strips 210 having the described shape share stress efficiently and substantially uniformly along the length of the strip. It is further surprisingly discovered that a repeating serpentine opening also participates in the distribution of strain energy throughout planar strip 210.

Such a uniform distribution of stress is illustrated in the stress contour diagram of FIG. 5. The diagram is a finite element analysis model showing the distribution of stress on the planar strip 210 having a length of about 440 mm with an applied strain of about 2% (or about 8 mm of elongation). As can be seen in the figure, regions of higher stress values 500 (Von Mises) are uniformly located along the exposed surfaces of bends 301 and the exposed surfaces of openings 404. Regions of lower stress values 502 are located along the internal portions of the bends 301. As nonlimiting examples, the regions of higher stress values 500 can range from about 400 Mpa to about 750 Mpa under the aforementioned strain conditions. Under similar conditions, regions of lower stress values 502 can range from about 0 Mpa to about 400 Mpa.

The planar strips 210 of the disclosure may be manufactured by, as a nonlimiting example, stamping. It should be understood that other methods of manufacturing planar strips 210 can also be used. In one embodiment, a continuous planar sheet can be cut a desirable length appropriate for a particular fuel cell stack 202. Strips 210 and openings 404 can then be cut or stamped form the continuous planar sheet for a particular fuel cell stack 202. The planar strips 210 may also be coated to electrically isolate the fuel cell stack 202 and/or impart corrosion resistance to the planar strips 210. Suitable coatings can include, for example, elastomeric coatings such as rubbers and plastics.

One of ordinary skill in the art should appreciate that the compression retention system 208 described herein provides less thermal mass and requires less volume than conventional systems using, for example, coiled springs with endplates. The compression retention system 208 of the invention is readily adaptable to different sizes and types of fuel cell stacks, and provides the same or lower spring rates in comparison to conventional spring packages.

Moreover, it should be appreciated that the planar strips of the disclosure can form a side plate (not shown) having a sliding interface with the fuel cell stack, i.e. the strips move up and down with the breathing of the fuel cell stack 202, and electrical and plumbing connections can more easily be provided than in conventional systems with rigid side plates. For this further reason, the use of the planar strips as a side plate also results in a reduction in overall weight of the fuel cell system.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fuel cell system comprising:
a fuel cell stack having a first end and second end, the stack comprising at least one fuel cell;
a first end unit disposed adjacent the first end of the fuel cell stack;
a second end unit disposed adjacent the second end of the fuel cell stack; and
a compression retention system including a plurality of generally planar strips, each of the strips having an upper portion and a lower portion and forming a plurality of bends therebetween, each of the strips extending from an outer portion of the first end unit to an outer portion of the second end unit, the upper portion of each of the strips individually connected to the outer portion of the first end unit and the lower portion of each of the strips individually connected to the outer portion of the second end unit, and each of the strips including at least one opening formed therein substantially parallel to a direction of stress exerted on the strips by the fuel cell stack,
wherein the at least one opening forms a serpentine shape, wherein a width of the opening along a length of each of the strips is variable and sides defining the opening remain spaced apart along the length of each of the strips, the opening starting in the upper portion and ending in the lower portion of each of the strips, each of the strips having a plurality of first zones alternating with a plurality of second zones, the first zones being regions of each of the strips existing before and after one of the plurality of bends, and each of the second zones existing at about a location of one of the plurality of bends, and
wherein the opening has a width at a center of each of the first zones and a center of each of the second zones that is greater than a width of the opening at transitions of the alternating first and second zones.

2. The fuel cell system of claim 1, wherein each of the strips is disposed adjacent the fuel cell stack.

3. The fuel cell system of claim 1, wherein each of the strips is under tension.

4. The fuel cell system of claim 1, wherein each of the strips urges the first end unit toward the second end unit, thereby applying compressive force to the fuel cell stack.

5. The fuel cell system of claim 1, wherein each of the strips militates against migration of a polymer electrolyte membrane of the at least one fuel cell.

6. The fuel cell system of claim 1, wherein the strips further form a side plate disposed adjacent the fuel cell stack.

7. The fuel cell system of claim 1, wherein the strips form a sliding interface with the fuel cell stack.

8. The fuel cell system of claim 1, wherein at least a portion of the planar strips is nested.

9. The fuel cell system of claim 1, wherein the at least one bend includes a repeating serpentine shape.

10. The fuel cell system of claim 1, wherein the at least one opening forms a repeating serpentine-shaped opening.

11. The fuel cell system of claim 1, wherein the average width of the first zone is less than about half the average width of the second zone.

12. The fuel cell system of claim 1, wherein each of the strips has a thickness from about 1 mm to about 10 mm.

13. The fuel cell system of claim 1, wherein the generally planar material is selected from a group consisting of metals, metal alloys, polymers, elastic textiles and combinations thereof.

14. The fuel cell system of claim 1, wherein the strips are produced by a stamping process.

15. A compression retention system for a fuel cell stack having a first end and second end, the stack including at least one fuel cell, a first end unit disposed adjacent the first end of the fuel cell stack, and a second end unit disposed adjacent the second end of the fuel cell stack, the compression retention system comprising:
a plurality of generally planar strips, each of the strips having an upper portion and a lower portion and forming a plurality of bends therebetween, each of the strips extending from the outer portion of a first end unit to an outer portion of the second end unit, the upper portion of each of the strips individually connected to the outer portion of the first end unit and the lower portion of each of the strips individually connected to the outer portion of the second end unit, and each of the strips including at least one opening formed therein substantially parallel to a direction of stress exerted on the strips by the fuel cell stack,
wherein the at least one opening forms a serpentine shape, and
wherein a width of the opening along a length of each of the strips is variable and sides defining the opening remain spaced apart along the length of each of the strips, the opening starting in the upper portion and ending in the lower portion of each of the strips, each of the strips having a plurality of first zones alternating with a plurality of second zones, the first zones being regions of each of the strips existing before and after one of the plurality of bends, and each of the second zones existing at about a location of one of the plurality of bends, and wherein the opening has a width at a center of each of the first zones and a center of each of the second zones that is greater than a width of the opening at transitions of the alternating first and second zones.

* * * * *